(12) United States Patent
Duque Biarge et al.

(10) Patent No.: US 10,962,638 B2
(45) Date of Patent: Mar. 30, 2021

(54) VEHICLE RADAR SENSING SYSTEM WITH SURFACE MODELING

(71) Applicant: Magna Electronics Inc., Auburn Hills, MI (US)

(72) Inventors: Sergio Duque Biarge, Munich (DE); Jorge J. Jácome Muñoz, Aschaffenburg (DE); Kalin Kabakchiev, Frankfurt am Main (DE); Roaldje Nadjiasngar, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 299 days.

(21) Appl. No.: 16/123,240

(22) Filed: Sep. 6, 2018

(65) Prior Publication Data

US 2019/0072666 A1 Mar. 7, 2019

Related U.S. Application Data

(60) Provisional application No. 62/555,220, filed on Sep. 7, 2017.

(51) Int. Cl.
*G01S 13/90* (2006.01)
*G01S 13/931* (2020.01)
*G06T 17/05* (2011.01)

(52) U.S. Cl.
CPC ........ *G01S 13/9023* (2013.01); *G01S 13/931* (2013.01); *G06T 17/05* (2013.01);
(Continued)

(58) Field of Classification Search
CPC ............... G01S 13/9023; G01S 13/931; G01S 2013/9314; G01S 2013/9315;
(Continued)

(56) References Cited

U.S. PATENT DOCUMENTS 4,943,796 A 7/1990 Lee
5,550,677 A 8/1996 Schofield et al.
(Continued)

FOREIGN PATENT DOCUMENTS

EP    1506893 A2    2/2005
WO    2011090484 A1    7/2011
WO    2018007995 A1    1/2018

OTHER PUBLICATIONS

Rapp et al. "Probabilistic ego-motion estimation using multiple automotive radar sensors." Robotics and Autonomous Systems 89, 136-146, 2017.
(Continued)

*Primary Examiner* — Timothy X Pham
(74) *Attorney, Agent, or Firm* — Honigman LLP

(57) ABSTRACT

A sensing system for a vehicle includes at least one radar sensor disposed at the vehicle and having a field of sensing exterior of the vehicle. The at least one radar sensor includes multiple transmitting antennas and multiple receiving antennas. The transmitting antennas transmit signals and the receiving antennas receive the signals reflected off objects. Radar data sensed by the at least one radar sensor is received at a control, and a vehicle motion estimation is received at the control. The control, responsive at least in part to the received sensed radar data and the received vehicle motion estimation, generates a surface model representative of the surface along which the vehicle is traveling.

17 Claims, 1 Drawing Sheet

(52) U.S. Cl.
CPC . *G01S 2013/932* (2020.01); *G01S 2013/9314* (2013.01); *G01S 2013/9315* (2020.01)

(58) Field of Classification Search
CPC ....... G01S 2013/932; G01S 2013/9332; G01S 2013/9353; G06T 17/05
See application file for complete search history.

(56) References Cited

U.S. PATENT DOCUMENTS

| | | | |
|---|---|---|---|
| 5,585,798 | A | 12/1996 | Yoshioka et al. |
| 5,670,935 | A | 9/1997 | Schofield et al. |
| 5,715,093 | A | 2/1998 | Schierbeek et al. |
| 5,796,094 | A | 8/1998 | Schofield et al. |
| 5,877,897 | A | 3/1999 | Schofield et al. |
| 5,949,331 | A | 9/1999 | Schofield et al. |
| 6,057,754 | A | 5/2000 | Kinoshita et al. |
| 6,067,110 | A | 5/2000 | Nonaka et al. |
| 6,085,151 | A | 7/2000 | Farmer et al. |
| 6,097,023 | A | 8/2000 | Schofield et al. |
| 6,118,401 | A | 9/2000 | Tognazzini |
| 6,118,410 | A | 9/2000 | Nagy |
| 6,201,642 | B1 | 3/2001 | Bos |
| 6,216,540 | B1 | 4/2001 | Nelson et al. |
| 6,313,454 | B1 | 11/2001 | Bos et al. |
| 6,353,392 | B1 | 3/2002 | Schofield et al. |
| 6,396,397 | B1 | 5/2002 | Bos et al. |
| 6,492,935 | B1 | 12/2002 | Higuchi |
| 6,498,620 | B2 | 12/2002 | Schofield et al. |
| 6,580,385 | B1 | 6/2003 | Winner et al. |
| 6,587,186 | B2 | 7/2003 | Bamji et al. |
| 6,674,895 | B2 | 1/2004 | Rafii et al. |
| 6,678,039 | B2 | 1/2004 | Charbon |
| 6,690,268 | B2 | 2/2004 | Schofield et al. |
| 6,690,354 | B2 | 2/2004 | Sze |
| 6,710,770 | B2 | 3/2004 | Tomasi et al. |
| 6,717,610 | B1 | 4/2004 | Bos et al. |
| 6,757,109 | B2 | 6/2004 | Bos |
| 6,771,208 | B2 | 8/2004 | Lutter et al. |
| 6,795,014 | B2 | 9/2004 | Cheong |
| 6,825,455 | B1 | 11/2004 | Schwarte |
| 6,831,591 | B2 | 12/2004 | Horibe |
| 6,876,775 | B2 | 4/2005 | Torunoglu |
| 6,903,677 | B2 | 6/2005 | Takashima et al. |
| 6,906,793 | B2 | 6/2005 | Bamji et al. |
| 6,919,549 | B2 | 7/2005 | Bamji et al. |
| 6,941,211 | B1 | 9/2005 | Kuroda et al. |
| 6,946,978 | B2 | 9/2005 | Schofield |
| 7,004,606 | B2 | 2/2006 | Schofield |
| 7,005,974 | B2 | 2/2006 | McMahon et al. |
| 7,012,560 | B2 | 3/2006 | Braeuchle et al. |
| 7,038,577 | B2 | 5/2006 | Pawlicki et al. |
| 7,042,389 | B2 | 5/2006 | Shirai |
| 7,053,357 | B2 | 5/2006 | Schwarte |
| 7,123,168 | B2 | 10/2006 | Schofield |
| 7,157,685 | B2 | 1/2007 | Bamji et al. |
| 7,176,438 | B2 | 2/2007 | Bamji et al. |
| 7,176,830 | B2 | 2/2007 | Horibe |
| 7,203,356 | B2 | 4/2007 | Gokturk et al. |
| 7,212,663 | B2 | 5/2007 | Tomasi |
| 7,283,213 | B2 | 10/2007 | O'Connor et al. |
| 7,310,431 | B2 | 12/2007 | Gokturk et al. |
| 7,321,111 | B2 | 1/2008 | Bamji et al. |
| 7,340,077 | B2 | 3/2008 | Gokturk et al. |
| 7,352,454 | B2 | 4/2008 | Bamji et al. |
| 7,375,803 | B1 | 5/2008 | Bamji |
| 7,379,100 | B2 | 5/2008 | Gokturk et al. |
| 7,379,163 | B2 | 5/2008 | Rafii et al. |
| 7,405,812 | B1 | 7/2008 | Bamji |
| 7,408,627 | B2 | 8/2008 | Bamji et al. |
| 7,432,848 | B2 | 10/2008 | Munakata |
| 7,526,103 | B2 | 4/2009 | Schofield et al. |
| 7,613,568 | B2 | 11/2009 | Kawasaki |
| 7,706,978 | B2 | 4/2010 | Schiffmann et al. |
| 7,765,065 | B2 | 7/2010 | Stiller |
| 8,013,780 | B2 | 9/2011 | Lynam |
| 8,027,029 | B2 | 9/2011 | Lu et al. |
| 8,698,894 | B2 | 4/2014 | Briggance |
| 9,036,026 | B2 | 5/2015 | Dellantoni et al. |
| 9,146,898 | B2 | 9/2015 | Ihlenburg et al. |
| 9,575,160 | B1 | 2/2017 | Davis et al. |
| 9,599,702 | B1 | 3/2017 | Bordes et al. |
| 9,689,967 | B1 | 6/2017 | Stark et al. |
| 9,753,121 | B1 | 9/2017 | Davis et al. |
| 2003/0138132 | A1 | 7/2003 | Stam et al. |
| 2003/0201929 | A1 | 10/2003 | Lutter et al. |
| 2005/0104089 | A1 | 5/2005 | Engelmann et al. |
| 2006/0091654 | A1 | 5/2006 | De Mersseman et al. |
| 2006/0238411 | A1* | 10/2006 | Fullerton ................ G01S 13/72 342/147 |
| 2010/0001897 | A1 | 1/2010 | Lyman |
| 2010/0245066 | A1 | 9/2010 | Sarioglu et al. |
| 2011/0037640 | A1 | 2/2011 | Schmidlin |
| 2013/0215271 | A1 | 8/2013 | Lu |
| 2017/0222311 | A1 | 8/2017 | Hess et al. |
| 2017/0254873 | A1 | 9/2017 | Koravadi |
| 2017/0276788 | A1 | 9/2017 | Wodrich |
| 2017/0315231 | A1 | 11/2017 | Wodrich |
| 2017/0356994 | A1 | 12/2017 | Wodrich et al. |
| 2018/0015875 | A1 | 1/2018 | May et al. |
| 2018/0045812 | A1 | 2/2018 | Hess |
| 2018/0059236 | A1 | 3/2018 | Wodrich et al. |
| 2018/0059666 | A1* | 3/2018 | Izzat ..................... G01C 21/30 |
| 2018/0065623 | A1 | 3/2018 | Wodrich et al. |
| 2018/0067194 | A1 | 3/2018 | Wodrich et al. |
| 2018/0089907 | A1* | 3/2018 | Maruoka ................ B60K 35/00 |
| 2018/0217231 | A1* | 8/2018 | Stanley ................... G01S 7/411 |
| 2018/0231635 | A1 | 8/2018 | Woehlte |
| 2018/0356511 | A1* | 12/2018 | Buddendick ............. G01S 7/35 |
| 2019/0056748 | A1* | 2/2019 | Budihal ................ G05D 1/0088 |
| 2019/0072667 | A1 | 3/2019 | Duque Biarge et al. |
| 2019/0072668 | A1 | 3/2019 | Duque Biarge et al. |
| 2019/0072669 | A1 | 3/2019 | Duque Biarge et al. |

OTHER PUBLICATIONS

Das et al., "Scan registration with multi-scale k-means normal distributions transform." Intelligent Robots and Systems (IROS), 2012 IEEE/RSJ International Conference on. IEEE, 2012.

Lundquist et al., "Estimation of the free space in front of a moving vehicle." 2009.

Schreier et al., "Robust free space detection in occupancy grid maps by methods of image analysis and dynamic B-spline contour tracking." Intelligent Transportation Systems (ITSC), 2012 15th International IEEE Conference on. IEEE, 2012.

* cited by examiner

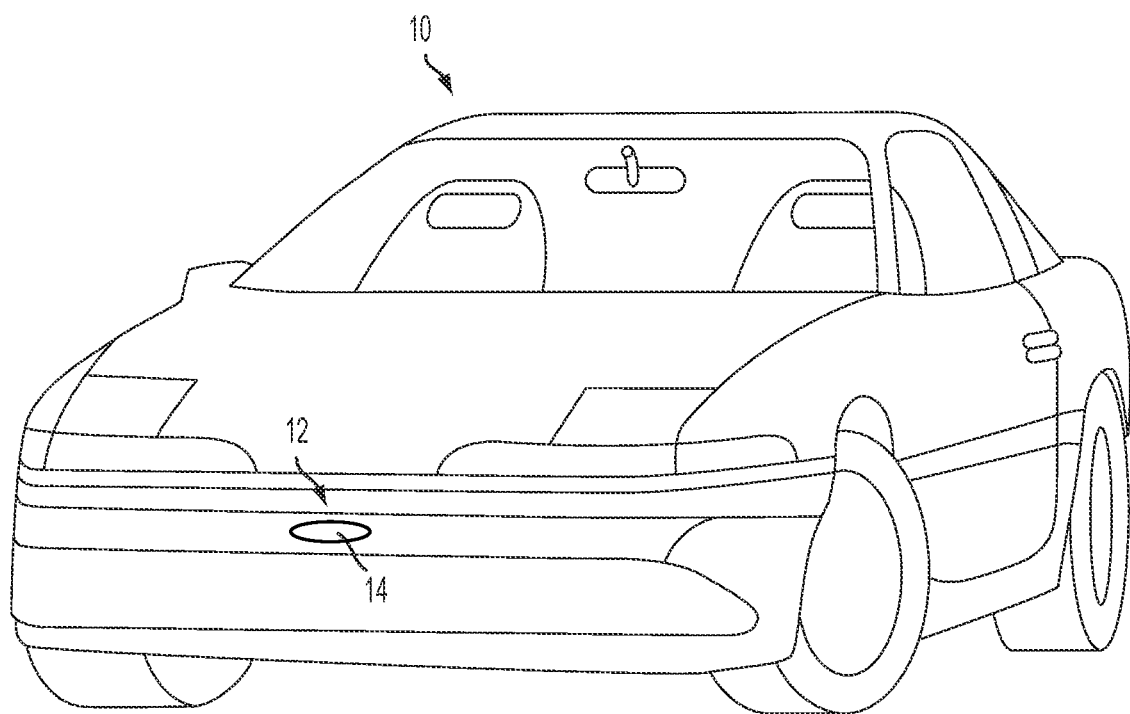

VEHICLE RADAR SENSING SYSTEM WITH SURFACE MODELING

CROSS REFERENCE TO RELATED APPLICATION

The present application claims the filing benefits of U.S. provisional application Ser. No. 62/555,220, filed Sep. 7, 2017, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes a sensor module or system disposed at the vehicle and comprising at least one radar sensor disposed at the vehicle and having a field of sensing exterior of the vehicle. The at least one radar sensor comprises multiple transmitting (Tx) antennas (transmitters) and receiving (Rx) antennas (receivers) to provide high definition, fine resolution in azimuth and/or elevation to determine high definition radar reflection responses for objects and surfaces detected by the system. The system includes a control, where outputs (such as radar data acquisitions of multiple scans) of the at least one radar sensor are communicated to the control, and where the control, responsive to the outputs of the at least one radar sensor, determines a surface topography or terrain of the ground or surface or road on and along which the vehicle is traveling. The system also detects the presence of one or more objects exterior the vehicle and within the field of sensing of the radar sensor.

The control of the sensing system receives radar data sensed by at least one radar sensor (such as radar data of multiple consecutive scans) and receives a vehicle motion estimation. The control, responsive to the received vehicle motion estimation and the received sensed radar data (which is time stamped so that it can be correlated with the vehicle motion), generates a surface model representative of the surface on and along which the vehicle is traveling.

The present invention provides a means to generate surface modelling while a vehicle is moving using automotive radar. The recognition of the environment is of special interest for Advanced Driver Assistance Systems (ADAS). The system of the present invention helps to determine if it is possible to drive over or along a surface or not. The system can also help to detect objects in the driving path. Another feature of the system of the present invention is the detection of changes in the path, such that the system may detect road curves or changes in the road slope.

These and other objects, advantages, purposes and features of the present invention will become apparent upon review of the following specification in conjunction with the drawings.

BRIEF DESCRIPTION OF THE DRAWINGS

FIG. 1 is a perspective view of a vehicle with a sensing system that incorporates a radar sensor in accordance with the present invention.

DESCRIPTION OF THE PREFERRED EMBODIMENTS

A vehicle sensing system, such as a driver assist system, object detection system, parking assist system and/or alert system, operates to capture sensing data exterior of the vehicle and may process the captured data to detect objects or other vehicles at or near the equipped vehicle and in the predicted path of the equipped vehicle, such as to assist a driver of the equipped vehicle in maneuvering the vehicle in a forward or rearward direction or to assist the driver in parking the vehicle in a parking space. The system includes a processor that is operable to receive sensing data from one or more sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle).

Referring now to the drawings and the illustrative embodiments depicted therein, a vehicle 10 includes an driver assistance system or sensing system 12 that includes at least one radar sensor unit, such as a forward facing radar sensor unit 14 (and the system may optionally include multiple exterior facing sensors, such as multiple exterior facing radar sensors or cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

Some automotive radars use MIMO (Multiple Input Multiple Output) techniques to create an effective virtual antenna aperture, which is significantly larger than the real antenna aperture, and delivers much better angular resolution than conventional radars, such as, for example, conventional scanning radars.

Actual algorithms for free space models are based on processing point list detections. The algorithms may elaborate the space around the sensor by giving a probabilistic volume to each point and concatenating each point together. The systems may generate an occupancy grid with the points from a detection list. These methods are oriented to point-like targets. Thus, the generation of surfaces is artificially generated by grouping some of the point target detection. This implies that if there are surfaces where there are few or no point targets, the surfaces will be poorly detected or possibly even fail to be detected by the radar system.

The system of the present invention receives as inputs an ego motion estimation (that estimates the motion of the measuring sensor that is disposed at the subject or equipped vehicle), a complex (phase and amplitude) acquisition for at least two consecutive scans of the radar system, a time stamp for each acquisition, and a sensor position of the measuring sensor with respect to the vehicle. The motion estimation is provided via determination of movement of objects relative to the vehicle, and/or may include an input from a vehicle system, such as responsive to a speed sensor and/or pitch, yaw and roll sensors or the like. Each of the acquisitions is dedicated to non-moving objects, and can be either two dimensional (2D) or three dimensional (3D). The dimensions in the case of a 2D acquisition include Range and Angle, while the dimensions in the case of having a volume (3D) include Range, Azimuth Angle and Elevation Angle.

The image/volume could also be provided in Cartesian coordinates. In cases that provide a 2D acquisition, just one surface may be retrieved. If the acquisition is 3D, then it is possible to retrieve multilevel surfaces.

During operation, the complex acquisitions received from the scans of the radar system are coregistered. That is, one acquisition is taken as a reference and the rest of the acquisitions are transformed such that every pixel/voxel refers to the same physical space. This coregistration may vary along the acquisition. The displacement of the vehicle (determined through the ego-motion and time stamp) is performed as a first coarse approach. A finer coregistration may be performed based on point-like targets, distributed targets or a mix of both, and/or it could depend on the scene nature.

Interferometric data is generated by pairing scans and multiplying one of each pair of the scans by the conjugate of the other scan. The scans may be paired in different ways, such as, for example, pairing consecutive scans in order to minimize the decorrelation and the amount of data.

The next step is to "flatten" the interferometric phase by taking into account a first model of a terrain model. When a terrain model is available, a synthetic phase of the terrain model may be generated and subtracted from the previously obtained interferometric phase. In cases where a terrain model is not available, the corresponding interferograms may be generated for a flat surface, taking into account the sensor position on the scans.

This residual phase (i.e., the flattened interferometric phase) will correspond to the unaccounted topography. Then, the phase may be jointly unwrapped using all generated interferograms. This results in a set of unwrapped phases. Then, the phases may be converted to heights by applying geometric conversions. The output from the geometric conversions will not be absolute. The absolute heights may be derived using the best points with its absolute position from the detection list.

Thus, the present invention generates surface modelling while the vehicle is moving using automotive radar. The system determines whether or not it is possible to drive through or over a detected surface. It may also assist in detecting objects in the driving path of the vehicle. The system may also detect changes in the driving path, and assist in detecting road curves or changes in the road slope.

The recognition of the environment is of special interest for Advanced Driver Assistance Systems. The system may provide an output for a driving assist system of the vehicle, such as one or more of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and (xi) intersection collision mitigation. Optionally, the output may be provided to an autonomous vehicle control system.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system. The forward viewing camera and/or the sensor of the lane determining system may comprise one of the cameras and/or one of the sensors of the autonomous vehicle control system.

The sensing system may include a machine vision system (comprising at least one exterior viewing camera disposed at the vehicle and an image processor for processing image data captured by the at least one camera), where information is shared between the stereo radar and the machine vision system.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A sensing system for a vehicle, said sensing system comprising:

at least one radar sensor disposed at a vehicle equipped with said sensing system and having a field of sensing exterior of the equipped vehicle;

wherein said at least one radar sensor comprises multiple transmitting antennas and multiple receiving antennas, and wherein said transmitting antennas transmit signals and said receiving antennas receive the signals reflected off objects;

a control comprising a processor, wherein radar data sensed by said at least one radar sensor is received at said control and processed at said processor;

wherein the received sensed radar data comprises radar data acquisitions for at least two consecutive scans by said at least one radar sensor;

wherein said control generates interferometric data by pairing scans and multiplying one scan of each pair of scans by the conjugate of the other scan of that pair;

wherein a vehicle motion estimation is received at said control;

wherein said control, responsive at least in part to processing at said processor of the received sensed radar data and the received vehicle motion estimation, generates a surface model representative of a road surface along which the equipped vehicle is traveling;

wherein said control flattens the interferometric data by taking into account a first model of a terrain model, in order to obtain a residual phase that corresponds to unaccounted topography of the surface; and wherein said control unwraps the residual phase using all interferograms generated for a flat surface, and wherein the unwrapped phases are converted to heights.

2. The sensing system of claim 1, wherein each radar data acquisition is time stamped.

3. The sensing system of claim 2, wherein said control generates the surface model responsive to a sensor position of said at least one radar sensor at the equipped vehicle.

4. The sensing system of claim 1, wherein said radar data acquisitions comprise two dimensional radar data acquisitions.

5. The sensing system of claim 1, wherein said radar data acquisitions comprise three dimensional radar data acquisitions.

6. The sensing system of claim 1, wherein said residual phase comprises subtracting a synthetic phase of said terrain model from said interferometric data.

7. The sensing system of claim 1, wherein said at least two consecutive scans are coregistered.

8. The sensing system of claim 1, wherein said control, responsive at least in part to processing at said processor of the received sensed radar data, detects presence of an object exterior the equipped vehicle and within the field of sensing of said at least one radar sensor.

9. The sensing system of claim 1, wherein a vision system of the equipped vehicle comprises at least one exterior viewing camera disposed at the equipped vehicle and an image processor for processing image data captured by the at least one camera, and wherein information is shared between said sensing system and the vision system of the equipped vehicle.

10. The sensing system of claim 1, wherein said sensing system comprises two or more individual radar sensors, each having multiple transmitting antennas and receiving antennas on an antenna array, and wherein information is shared between the individual radar sensors operating in stereo to determine high definition radar reflection responses for object detection by said sensing system.

11. The sensing system of claim 1, wherein said at least one radar sensor is disposed at a front portion of the equipped vehicle and senses forward of the equipped vehicle.

12. The sensing system of claim 1, wherein said sensing system provides an output for at least one driving assist system function selected from the group consisting of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and (xi) intersection collision mitigation.

13. A sensing system for a vehicle, said sensing system comprising:

at least one radar sensor disposed at a vehicle equipped with said sensing system and having a field of sensing exterior of the equipped vehicle;

wherein said at least one radar sensor comprises multiple transmitting antennas and multiple receiving antennas, and wherein said transmitting antennas transmit signals and said receiving antennas receive the signals reflected off objects;

a control comprising a processor, wherein radar data sensed by said at least one radar sensor is received at said control and processed at said processor;

wherein the received sensed radar data comprises radar data acquisitions for at least two consecutive scans by said at least one radar sensor;

wherein a vehicle motion estimation is received at said control;

wherein said control, responsive at least in part to (i) processing at said processor of the received sensed radar data, (ii) processing at said processor of the received vehicle motion estimation and (iii) a sensor position of said at least one radar sensor at the equipped vehicle, generates a surface model representative of a road surface along which the equipped vehicle is traveling;

wherein said control generates interferometric data by pairing scans and multiplying one scan of each pair of scans by the conjugate of the other scan of that pair, and wherein said control flattens the interferometric data by taking into account a first model of a terrain model, in order to obtain a residual phase that corresponds to unaccounted topography of the surface;

wherein said control unwraps the residual phase using all interferograms generated for a flat surface, and wherein the unwrapped phases are converted to heights; and wherein said sensing system provides an output for at least one driving assist system function selected from the group consisting of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and (xi) intersection collision mitigation.

14. The sensing system of claim 13, wherein each radar data acquisition is time stamped.

15. The sensing system of claim 13, wherein said residual phase comprises subtracting a synthetic phase of said terrain model from said interferometric data.

16. A sensing system for a vehicle, said sensing system comprising:

at least one radar sensor disposed at a vehicle equipped with said sensing system and having a field of sensing exterior of the equipped vehicle;

wherein said at least one radar sensor comprises multiple transmitting antennas and multiple receiving antennas, and wherein said transmitting antennas transmit signals and said receiving antennas receive the signals reflected off objects;

a control comprising a processor, wherein radar data sensed by said at least one radar sensor is received at said control and processed at said processor;

wherein the received sensed radar data comprises radar data acquisitions for at least two consecutive scans by said at least one radar sensor, and wherein said at least two consecutive scans are coregistered;

wherein a vehicle motion estimation is received at said control;

wherein said control, responsive at least in part to processing at said processor of the received sensed radar data and the received vehicle motion estimation, generates a surface model representative of a road surface along which the equipped vehicle is traveling;

wherein said control generates interferometric data by pairing scans and multiplying one scan of each pair of scans by the conjugate of the other scan of that pair, and wherein said control flattens the interferometric data by taking into account a first model of a terrain model, in order to obtain a residual phase that corresponds to unaccounted topography of the surface;

wherein said control unwraps the residual phase using all interferograms generated for a flat surface, and wherein the unwrapped phases are converted to heights;

wherein said control, responsive at least in part to processing at said processor of the received sensed radar data, detects presence of an object exterior the equipped vehicle and within the field of sensing of said at least one radar sensor; and wherein said sensing system provides an output for at least one driving assist system function selected from the group consisting of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and (xi) intersection collision mitigation.

17. The sensing system of claim 16, wherein said residual phase comprises subtracting a synthetic phase of said terrain model from said interferometric data.

* * * * *